Figure 7:
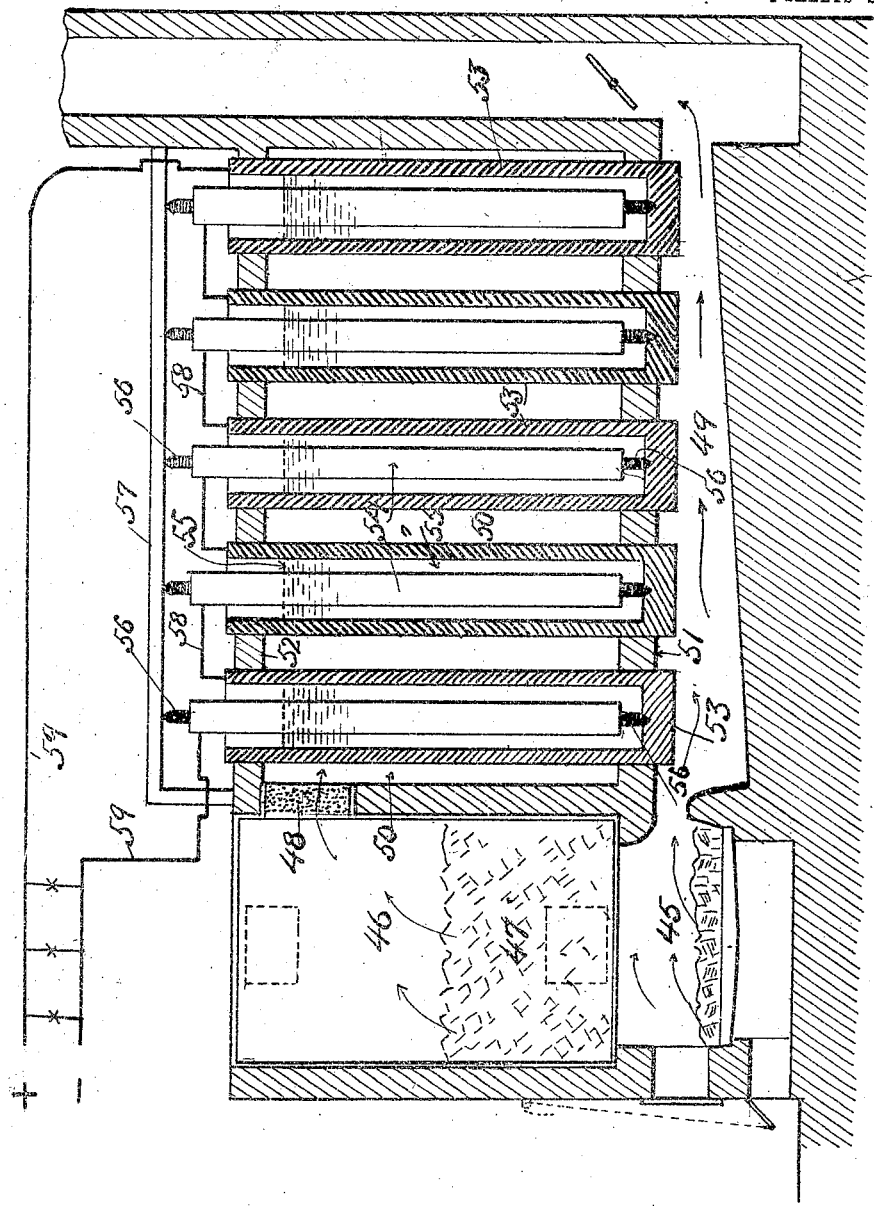

No. 736,016. PATENTED AUG. 11, 1903.
J. H. REID.
PROCESS OF GENERATING ELECTRICITY.
APPLICATION FILED MAY 17, 1902.
NO MODEL. 4 SHEETS—SHEET 1.
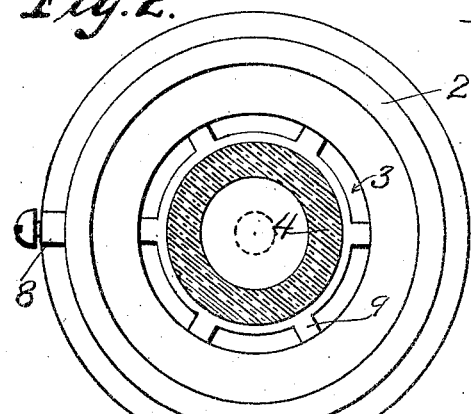
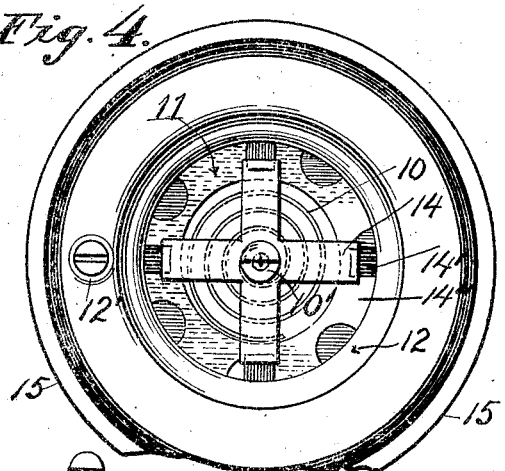
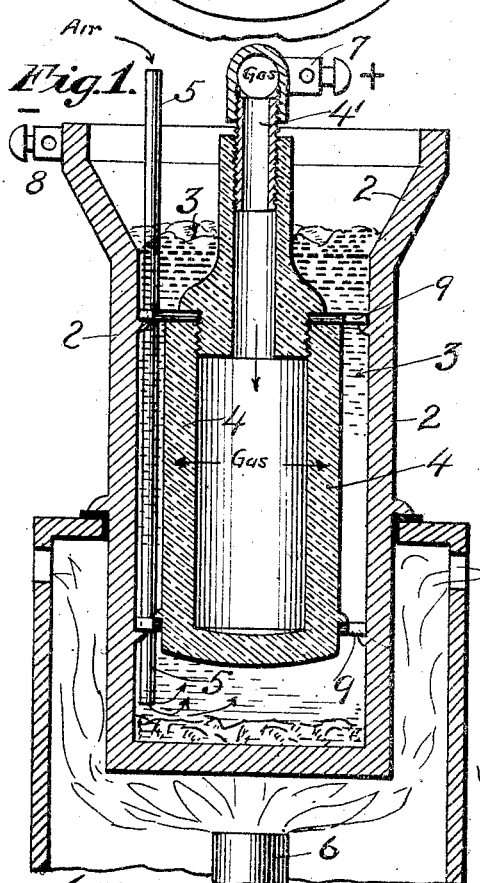
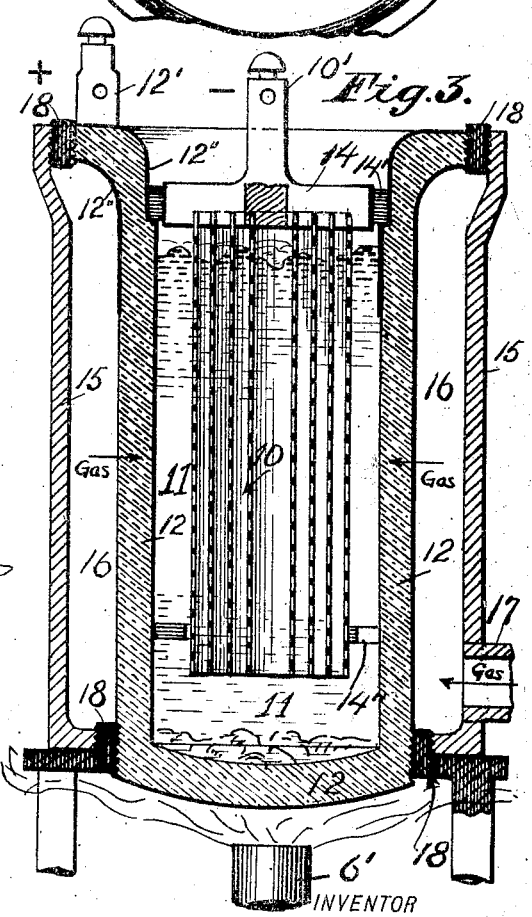
WITNESSES
INVENTOR
James H. Reid.
BY
ATTORNEY

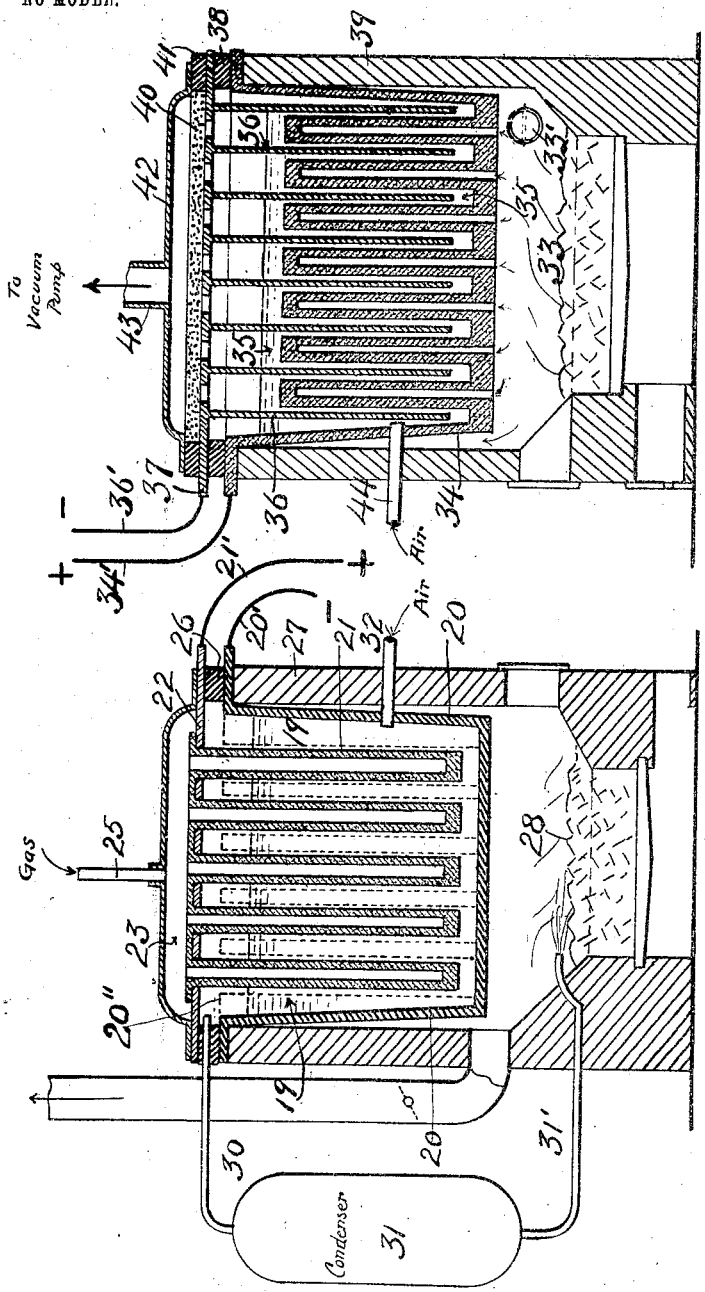

No. 736,016. PATENTED AUG. 11, 1903.
J. H. REID.
PROCESS OF GENERATING ELECTRICITY.
APPLICATION FILED MAY 17, 1902.
NO MODEL. 4 SHEETS—SHEET 3.

WITNESSES:

INVENTOR
James H. Reid
BY
ATTORNEY

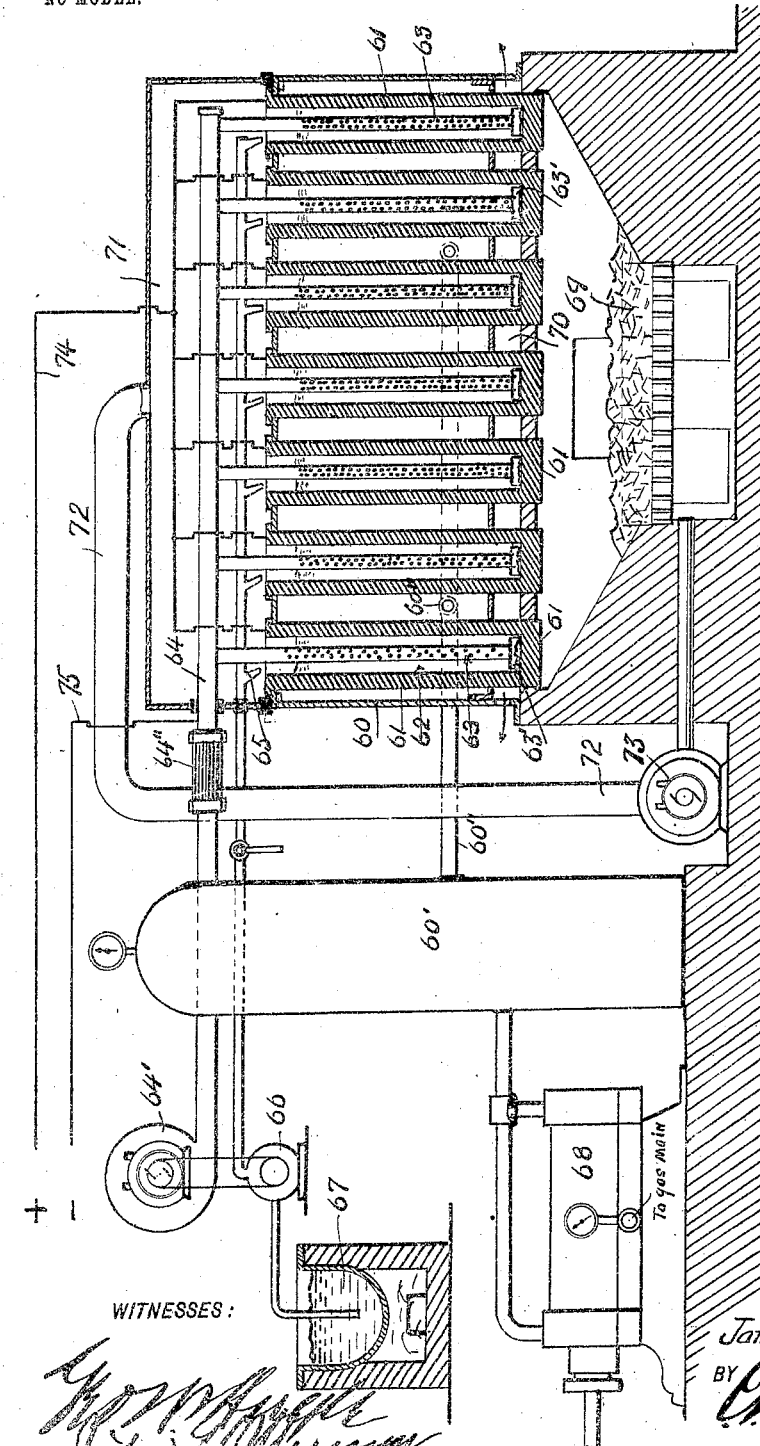

No. 736,016.
Patented August 11, 1903.

UNITED STATES PATENT OFFICE.

JAMES H. REID, OF EAST ORANGE, NEW JERSEY.

PROCESS OF GENERATING ELECTRICITY.

SPECIFICATION forming part of Letters Patent No. 736,016, dated August 11, 1903.

Application filed May 17, 1902. Serial No. 107,742. (No specimens.)

*To all whom it may concern:*

Be it known that I, JAMES H. REID, a resident of East Orange, in the county of Essex and State of New Jersey, have invented a certain new and Improved Process of Generating Electricity, of which the following is a full, clear, and exact specification.

My invention relates to the generation of electricity direct from fuel-gas; and the present invention is in the art or process.

The object of my invention is to develop electric energy from gas such as is ordinarily used for combustion, but by means of a slower oxidation than is caused by combustion as I now understand the method of developing such energy.

The invention consists in certain steps or subprocesses by which the process of developing electricity is carried out. The mechanism used to convey the gases and secure the development of electricity by this process is believed to be new in whole or in part, but is not herein claimed, as the requirements of the Patent Office exclude such claims.

The process or method may be carried out with very different mechanisms.

For convenience of description I will describe the mechanism illustrated and the various steps constituting the method or process so far as I am able to state them.

Figure 1 is a vertical central section of an electric generator in which my process may be carried out. Fig. 2 is a plan view thereof, showing in cross-section the porous tube or chamber constituting an electrode. Fig. 3 is a vertical section of a modified form of apparatus. Fig. 4 is a top or plan view of the generator of Fig. 3. Fig. 5 is a vertical section illustrating a modification of the generator wherein a plurality of porous tubes or chambers are employed as electrodes in a single body of electrolyte. Fig. 6 is a similar section illustrating an apparatus in which the products of combustion are used as the fuel-gases. Fig. 7 is a vertical section of an apparatus adapted for the use of previously-purified gases. Fig. 8 is a vertical section of a large generator coupled to a gas-retort.

In carrying out my invention with the mechanism of Fig. 1 I employ a vessel 2, which is a conductor of electricity and may be a metal pot. This vessel contains a quantity of material 3 which is an electrolyte, and this electrolyte is maintained in a liquid form by the application of heat. The electrolyte which I prefer to employ is an alkaline solution, such as hydrate of sodium or hydrate of potassium, and this in my process is maintained liquid at a temperature of something like 400° Fahrenheit, although results may be obtained at any temperature known to me whereby the electrolyte is kept in liquid form. A tube or chamber 4, composed of porous carbon, extends into the electrolyte and forms an electrode. This tube or chamber 4 is closed at the top and is supported by insulating-brackets 9, so as to be out of contact or electrical connection with the pot 2. A metallic pipe 4' serves for the introduction of a fuel-gas into this porous-carbon chamber. The gas I have successfully used is common city gas, which is rich in carbon; but I have reason to believe that other fuel-gases may be employed. Connected with the gas-supply tube 4' is a binding-post 7, and connected to the pot 2 there is a binding-post 8. These binding-posts may be considered the opposite poles or points of connection to the battery or cell, the chamber 4 being positive and the pot 2 of negative polarity. The chamber 4 is so insulated that the gas-supply pipe does not serve as a means to short circuit the electric current. A tube 5 serves for the introduction of air or oxygen into the electrolyte, and air may be forced through said tube to near the bottom of the electrolyte, whence in rising the air or oxygen permeates the electrolyte and is brought in contact with the outer surface of the tube, chamber, or electrode 4. A burner 6 under pot 2 serves as a means for applying heat to the vessel containing the electrolyte.

When a fuel-gas is forced into the porous-carbon chamber 4, it is believed the same percolates through the porous walls, which are permeable to a gas, but not to a liquid. The carbon and hydrogen of the gas are believed to unite with the oxygen in the electrolyte or in the porous-carbon wall. A production or development of electricity follows and will continue as the gas is supplied to one side of the porous-carbon partition or wall and oxygen to the other side—that is, to the electrolyte.

The porous-carbon tube or chamber 4 is of such character as to permit the passage of a gas through the pores, but will not permit the passage of a liquid, especially a liquid of the character employed as an electrolyte.

As shown in Fig. 1, the pot 2 is open at the top. This permits the escape of any gases which may be thrown off from the surface of the electrolyte.

My theory of the mode of operation is that the carbon and hydrogen of the fuel-gas combine with oxygen of the electrolyte either within the pores of the porous carbon or within the electrolyte. Whether this be true or not, it is certain that the operation of the apparatus when used as described is to develop electric energy which may be utilized as from any other battery, the battery connections being made at 7 8, as stated.

The electrolyte would probably be expelled from the porous tube by gas-pressure even should it penetrate the porous material, which it should not do under ordinary conditions.

In the form of generator illustrated in Figs. 3 and 4 the porous-carbon pot 12 is constructed to contain the electrolyte 11, and the electrolyte 11 contains a conductor 10, to which electrical connection can be made. The walls of the pot 12 are preferably made non-porous above the body of electrolyte by the application of a coating of enamel, as at 12″. The vertical walls of the porous pot are inclosed by a cylinder 15 of any suitable material, and if a conductor of electricity the same is insulated from the pot 12 by insulating-bushings 18. The fuel-gas is introduced into chamber through a pipe 17. The conductor 10 is preferably composed of a number of turns of perforated sheet metal, which are fastened in the head 14, carrying the binding-post 10′. 12′ is the binding-post of the porous-carbon pot 12. The head 14 is insulated from the said carbon pot by insulating-blocks 14′, and the lower part of the collector 10 is held in place by insulator 14″, which insulator is perforated to allow circulation of the electrolyte. The electrolyte is maintained in liquid form by heat, as from the burner 6′. In this example, as in the preceding, a fuel-gas is fed under pressure to one side of the porous wall or partition 12, and an electrolyte charged or supplied with oxygen is applied to the other side of said wall. The operation and development of electricity are as before described. The porous-carbon conductor will in each case be positively charged with electricity, while the metallic conductor in direct contact with the electrolyte will be negatively charged.

The generator of Fig. 1 may be extended, as shown in Fig. 5. In this case the iron pot 20 is located in a brick oven 27, and fire-chamber 28 is utilized to heat the pot and contents. The pot contains an electrolyte 19, and the gases are introduced through carbon tubes 21, which depend from the plate 22. A chamber 23 above this plate is supplied with gas through a pipe 26. Air is supplied to the electrolyte through pipe 32. The dotted lines 20″ indicate electrical conductors of perforated sheet metal connected to the pot 20. When gas is forced into tubes 21, electric energy will be developed at the parts 20″ and 21′, which parts are separated by insulation 26. The vapors and gases which arise from the electrolyte are preferably conducted from the pot through a pipe 30 and to a condenser 31, and the gases may thence be conveyed to the furnace 28 by pipe 31′.

The generators hereinbefore described have dealt with prepared fuel-gas. A generator may be made to utilize the gaseous products of combustion from a fire. Such a generator is illustrated in Fig. 6, in which figure the numeral 39 denotes a furnace in which a coking-fire 33 is maintained. A pot 34, of porous carbon, is suspended above the fire. The damper 33 is usually closed after the fire is started. The carbon pot 34 contains the electrolyte 35, which rises above the level of the inverted-tube portions of the pot. Air is introduced to the electrolyte through pipe 44. Iron or similar metallic elements 36 depend from plate 37 and extend into the electrolyte. Plate 37 is separated from the part 34 by suitable insulation 38.

The pressure of gas in the furnace is sufficient to induce the entrance thereof into pores of the porous-carbon pot; but to increase such pressure I place a hood 42 above the perforated plate 37, and by connecting a vacuum-pump at 43 the gas-pressure against the outside of the carbon pot may be increased.

When it is desired to generate electricity in immediate proximity to the fuel from which the energy is derived, I prefer a generator of the type illustrated at Fig. 7, in which 46 represents a coal-gas retort for distilling gases from the material 47. The retort is placed above furnace 45. The combustion-chamber 49 extends below the series of porous tubes or pots 53, which tubes contain electrolyte 55 and metallic conductors 54. The conductors 54 are held by insulators 56 at their upper and lower ends, the insulators being centered in the bottoms of the tubes or pots 54 and in top bar 57.

Gas from the retort 46 discharges through a porous partition 48 into the chamber 50, which incloses pots or tubes 53. 51 denotes the bottom, and 52 the top, of this chamber.

The porous partition serves to equalize the pressure of gas in chamber 50.

A series arrangement of the generators is shown by circuit 59 and connections 58.

Where it is convenient to employ illuminating or fuel gas instead of gas retorted for use, I may employ such a mechanism as is shown in Fig. 8. In this construction a furnace-chamber 69 surrounds the bottoms of the porous tubes or pots. A gas-chamber 60 surrounds the bodies of these tubes, and an air-space 70 between the furnace and chamber serves to shut off excess of heat.

Each tube 61 contains the fluid electrolyte 62, and a conductor 63, preferably a perforated metal pipe resting on insulator 63', extends through the electrolyte. The conductors 63 all communicate with air-pipe 64, which extends from blower 64'.

64'' is an insulating-coupling in pipe 64.

65 indicates a supply-pipe for the electrolyte and extends to each porous tube or pot, so that a fresh supply of the liquid electrolyte may be supplied by pump 66 from vat 67.

As the gas from a city-main usually has a pressure of only a few ounces, I prefer to increase such pressure by means of a compressor 68, by which gas is forced under pressure into chamber 60 through pipe 60''.

In order to save any waste gas and to dispose of incombustible gases, I may place a hood 71 over the porous tubes or pots and exhaust the gas therefrom through pipe 72 and blower or pump 73, so as to discharge into furnace 69.

The generators of Fig. 8 are connected in multiple, the porous tubes or pots being all combined to conductor 74, while the other side of the circuit is connected by pipe 64 to conductor 75. This arrangement gives a large electrical current of low voltage.

From the above it will be understood that many changes may be made in the mechanism by which my method is carried out.

The porous-carbon wall, partition, tube, or electrode which I use at the present time is a carbon manufactured in the electrical furnace and is a merchantable article known to the trade. At the temperature at which it is used in my generator it will endure indefinitely. After a continuous use of twenty-one days I had microscopic examination made and no deterioration was perceptible.

The electrolyte which I employ can also be used indefinitely. Water is added to the alkaline solution from time to time; but no considerable deterioration of the alkali was observable in the above test.

I am unable to give the exact amount of gas consumed for each electrical unit developed, but am convinced that the quantity of gas fuel consumed is not greater than would be required for developing a similar amount of energy under a steam-boiler and transforming the energy into electricity by means of an engine and dynamo. In my opinion I use very much less fuel than is required in the usual process of electrical development.

What I claim is—

1. The process or method of converting the potential energy of gaseous fuel into electrical energy, which consists in conducting a fuel-gas into a porous receptacle pervious to gas but impervious to liquid, maintaining a heated liquid electrolyte at the opposite face of said receptacle, supplying oxygen to the heated electrolyte, and providing conductors for the developed electricity from the porous receptacle and from the liquid electrolyte.

2. The process or method of converting the potential energy of gaseous fuel that consists in diffusing gaseous fuel in or through the pores of an electric conductor, supplying oxygen to oxidize the gaseous fuel therein, providing a suitable path or exhaust for the products of oxidation, and in connection therewith providing a collector for the electric current.

3. The process or method of converting the potential energy of gaseous fuel that consists in diffusing the gaseous fuel in a porous electric conductor, maintaining said conductor in surface contact with an oxygen-bearing fluid of lower conductivity than said conductor, maintaining the oxygen-bearing fluid at a higher temperature than the incoming gas, and providing an external circuit from said conductor and through said fluid, substantially as described.

4. The process or method of converting the potential energy of gaseous fuel, that consists in restricting or restraining the oxidation of gaseous fuel by imposing thereon limitations of minute subdivision in contact with or in the pores of an electric conductor and at a temperature lower than that of rapid oxidation, and at unequal temperatures on opposite faces of said electric conductor, and providing a suitable electric circuit, substantially as described.

5. The process or method of converting the potential energy of gaseous fuel, that consists in diffusing gaseous fuel continuously in the pores of an electric conductor, continuously supplying oxygen thereto through the medium of a fluid electrolyte, and discharging the products of oxidation into and from said fluid by gravity displacement, substantially as described.

6. The process or method of converting the potential energy of gaseous fuel that consists in diffusing gaseous fuel in a porous electric conductor from one side thereof, maintaining a fluid of electrolyte upon the other side of said conductor and therefrom supplying oxygen for the oxidation of said fuel, maintaining the temperatures of said conductor and the fluid below the temperature of rapid oxidation, and unequal with reference to each other, and providing external electrical collectors, substantially as described.

In testimony whereof I have hereunto set my hand, in the presence of two witnesses, this 10th day of May, 1902.

JAMES H. REID.

In presence of—
 GEO. W. ANGLE,
 JOHN H. MUNSON.